United States Patent [19]
Hamada et al.

[11] Patent Number: 5,475,670
[45] Date of Patent: Dec. 12, 1995

[54] DEFLECTION PLATE FOR OPTICAL PICK-UP DEVICE

[75] Inventors: Ken Hamada, Suita; Hideyuki Nakanishi, Kyoto; Hirokazu Shimizu, Suita, all of Japan

[73] Assignee: Matsushita Electronics Corporation, Osaka, Japan

[21] Appl. No.: 129,547

[22] Filed: Sep. 29, 1993

Related U.S. Application Data

[63] Continuation of Ser. No. 814,095, Dec. 26, 1991, abandoned.

[30] Foreign Application Priority Data

Dec. 28, 1990 [JP] Japan ................................. 2-409057

[51] Int. Cl.$^6$ ............................... G11B 7/00; G02B 5/18
[52] U.S. Cl. ..................... 369/112; 369/44.23; 369/103; 369/44.12; 359/573; 359/575
[58] Field of Search ................................. 369/112, 120, 369/44.14, 44.37, 44.23, 111, 103, 44.24, 44.12; 359/566, 569, 568, 575, 573, 574; 385/14, 37

[56] References Cited

U.S. PATENT DOCUMENTS

| | | | |
|---|---|---|---|
| 4,057,326 | 11/1977 | Knop | 359/568 |
| 4,246,338 | 1/1981 | Kaplan | 359/575 |
| 4,358,200 | 11/1982 | Heemskerk et al. | 369/44.12 |
| 4,733,943 | 3/1988 | Suzuki et al. | 359/575 |
| 4,829,506 | 5/1989 | Bressers et al. | 369/112 |
| 4,876,680 | 10/1989 | Misawa et al. | 369/44.23 |
| 4,885,734 | 12/1989 | Yuzo | 369/112 |
| 4,894,815 | 1/1990 | Yamanaka | 369/112 |
| 4,904,856 | 2/1990 | Nagahama et al. | 369/44.23 |
| 4,929,823 | 5/1990 | Kato et al. | 369/44.23 |
| 4,945,529 | 7/1990 | Ono et al. | 369/110 |
| 5,062,098 | 10/1991 | Hori et al. | 369/112 |
| 5,066,138 | 11/1991 | Toide et al. | 369/112 |
| 5,122,903 | 6/1992 | Aoyama et al. | 359/575 |
| 5,132,843 | 7/1992 | Aoyama et al. | 359/573 |
| 5,227,915 | 7/1993 | Grossinger et al. | 359/575 |

FOREIGN PATENT DOCUMENTS

| | | |
|---|---|---|
| 56-57013 | 5/1981 | Japan . |
| 63-222341 | 9/1988 | Japan . |
| 63-222340 | 9/1988 | Japan . |
| 64-4926 | 11/1989 | Japan . |

*Primary Examiner*—Frank Gonzalez
*Assistant Examiner*—Nabil Hindi
*Attorney, Agent, or Firm*—Ratner & Prestia

[57] ABSTRACT

A deflection plate for deflecting laser beams includes a transparent plate on which two grating areas are formed on the same surface. The first grating area has a plurality of parallel grooves. The second grating area has a plurality of grooves in a predetermined pattern. The depth and/or the duty ratio of the grooves in the first grating area differs from that in the second grating area.

6 Claims, 12 Drawing Sheets

DEFLECTION PLATE FOR OPTICAL PICK-UP DEVICE

This application is a continuation of application Ser. No. 07/814,095 filed Dec. 26, 1991, now abandoned.

BACKGROUND OF THE INVENTION

1. Field of The Invention

The present invention relates to a deflection plate for use in an optical pick-up device for reading an information from an optical disk.

2. Description of the Prior art

Optical disk systems, including compact disc (Trade Mark) systems, have become an increasingly important means of recording and storing information. In these systems, the optical pick-up devices are used to read the information from the recording medium.

An optical pick-up device typically consists of several optical components, including a semiconductor laser as the light source, a photo-diode as the detector, and lenses and prisms. Some of the recent optical pick-up devices are employed with a new deflection plate type signal detection method.

A conventional deflection plate type optical pick-up device is disclosed, for example, in U.S. Pat. No. 4,358,200 which is issued Nov. 9, 1988, Japanese Patent Laid-open Publication No. 64-4926 published Jan. 10, 1989, Japanese Patent Laid-open Publication No. 63-22340 published Sep. 16, 1988 or Japanese Patent Laid-open Publication No. 63-222341.

In FIG. 21, a conventional deflection plate-type optical pick-up device such as disclosed in Japanese Patent Laid-open Publication No. 56-57013, is shown wherein the laser beam Lp' emitted by the semiconductor laser chip 31, passing through the deflection plate 32, is converged by the lens 33 to focus a spot on the optical disk 34, from which the laser beam Lp is then reflected. The reflected laser beam Lp is converged again by the lens 34 and then deflected by the deflection plate 32 so as to focus on the servo detection detector 35.

In FIG. 22, another conventional deflection plate-type optical pick-up device, such as disclosed in Japanese Laid-open Patent Publication No. 64-4926, is shown. The deflection plate 42 has a first diffraction area 42a on one surface facing the laser diode 41 and a second diffraction 42b on the other surface thereof. The laser beam Lp emitted by the laser diode 41 is split into three beams Lp1, Lp2, and Lp3 having diffraction orders of "+1", "0", and "−1" by the first diffraction area 42a. The three beams Lp1, Lp2, and Lp3 are converged by the lens 43 so as to focus spots Sbp, Sap and Scp on the surface of optical disk 44, respectively. Three beams Lp1, Lp2, and Lp3 are impinged on the optical disk 44 and are reflected, through the lens 43, to the deflection plate 42 at which each of three beams is further split by the second diffraction area 42b into three beams having different diffraction orders. From such re-split beams, only three beams of "+1" diffraction order Lp1', Lp2', and Lp3' are led to the photo detector 45 so as to focus spots Sbp", Sap", and Scp" thereon. The laser spots Sbp" and Scp" are used for tracking error signals and spot Sap" is for a focus error signal.

In FIG. 23, a conventional deflection plate for an optical pick-up device, such as disclosed in Japanese Patent Laid-open Publication 63-222341 is shown. The deflection plate 52 is formed in a pattern in which the grated depth is varied from the center to the edges to provide arcade ribs in order to impart a particular optical filtering function.

In FIG. 24, another conventional deflection plate for an optical pick-up device, such as disclosed in Japanese Patent Laid-open Publication No. 63-222340 is shown. The deflection plate 62 is formed in a pattern in which the duty ratio is varied from the center to the edges in order to impart a particular optical filtering function.

However, there are several problems with the above described conventional deflection plates. According to the deflection plate shown in FIG. 22, two diffraction grating patterns are formed respectively on opposite surfaces of the deflection plate. The first pattern formed on the bottom surface when viewed in FIG. 22 is used for splitting the laser beam emitted by the laser unit into three beams, and the second pattern formed on the top surface in FIG. 22 is used for deflecting the reflected beams from the optical disk, toward the servo detection detector.

In addition, the optimum diffraction efficiency of "1" order of the first pattern for the three-beam generation and that of the second pattern for the deflection of the reflected beams differ such that optimum diffraction efficiency of "1" order of the latter pattern is, in general, greater than the former.

However, in the deflection plates illustrated in FIGS. 23 and 24, the diffraction efficiencies of the laser beam emitted from the semiconductor laser and the reflected laser beam from the recording medium are the same. Furthermore, although the deflection plate illustrated in FIG. 22 can have the different diffraction efficiencies of the laser beam emitted from the semiconductor laser and the laser beam reflected from the recording medium, it is necessary to form the diffraction deflection plate patterns on both sides, resulting in a complicated manufacturing process.

SUMMARY OF THE INVENTION

The object of the present invention is therefore to provide an imaging device which solves these problems.

The present invention has been developed with a view to substantially solving the above described disadvantages and has for its essential object to provide an improved deflection plate for deflection laser beams.

In order to achieve the aforementioned objective, a deflection plate for deflecting laser beams comprises a transparent plate having first and second surfaces; a first grating area formed on the first surface and having a plurality of parallel grooves formed in the transparent plate with a first predetermined duty ratio, each parallel groove having a first predetermined depth; and a second grating area formed the the first surface and surrounding the first grating area and having a plurality of grooves formed in the transparent plate in a predetermined pattern with a second predetermined duty ratio, each groove having a second predetermined depth.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

FIRST EMBODIMENT

Figure 1:
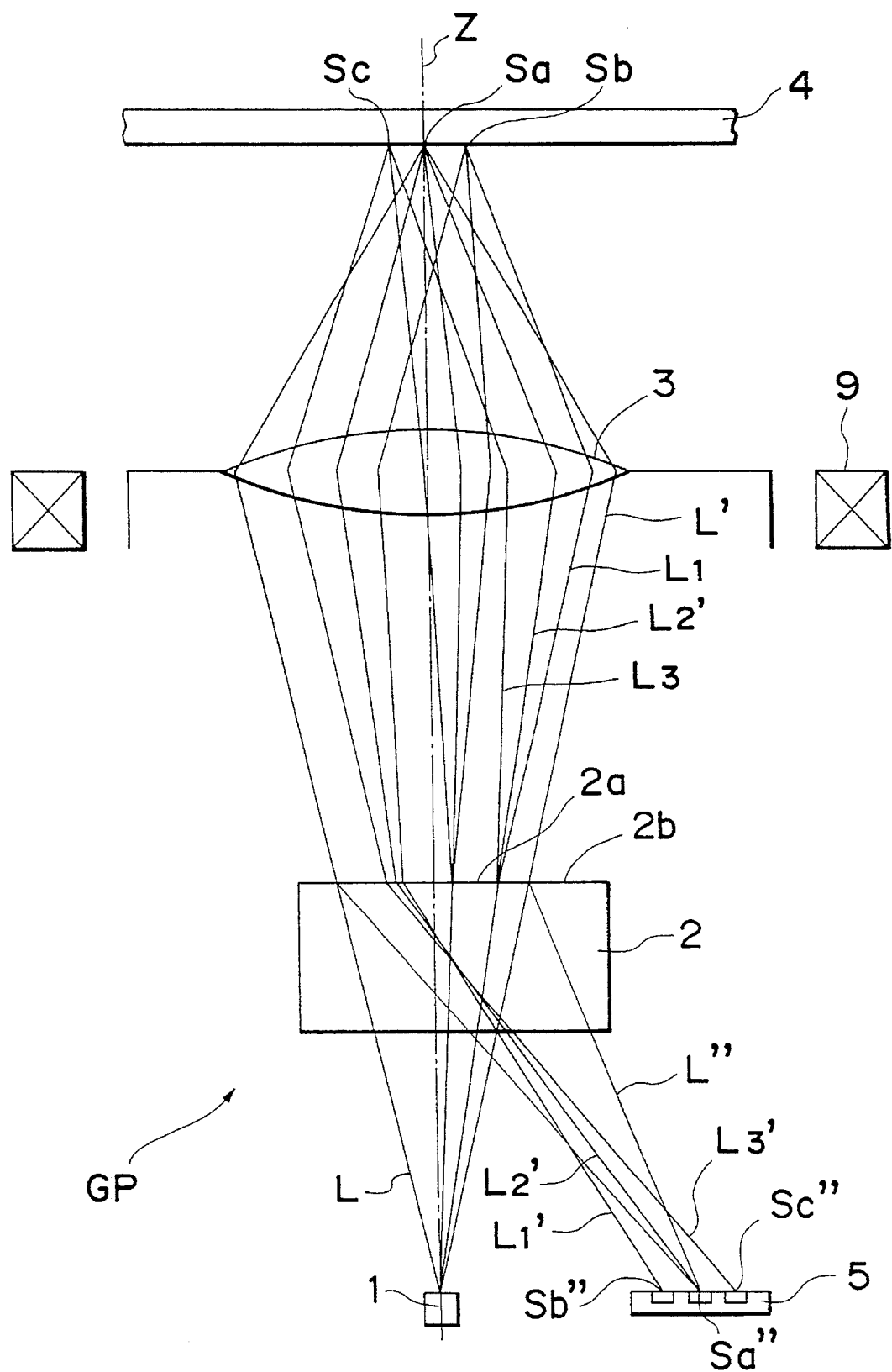
FIG. 1 is a schematic view of an optical pick-up device according to a first embodiment of the present invention.

Referring to FIG. 1, a deflection plate type optical pick-up device for picking up the information from an optical disk according to a first embodiment of the present invention is shown. The deflection plate type optical pick-up device GP comprises a laser diode 1 for emitting a laser beam L along an axis Z, a deflection plate 2, and an optical lens 3 for converging the laser beam. The lens 3 has an optical axis which is in alignment with the axis Z of the laser diode 1. The focus point of lens 3 is adjustable by the means of electric magnetic coil 9.

The deflection plate 2 is provided between the laser diode 1 and the lens 3 with its main plane perpendicular to the axis Z. The deflection plate 2 has two diffraction areas 2a and 2b bearing different hologram patterns on one side surface facing the lens 3, and has a size large enough to extend across the laser beam L. The hologram patterns of diffraction areas 2a and 2b will be described later with reference to FIGS. 3 and 4. A photo detector 5 is provided adjacent the laser diode 1.

Figure 2:
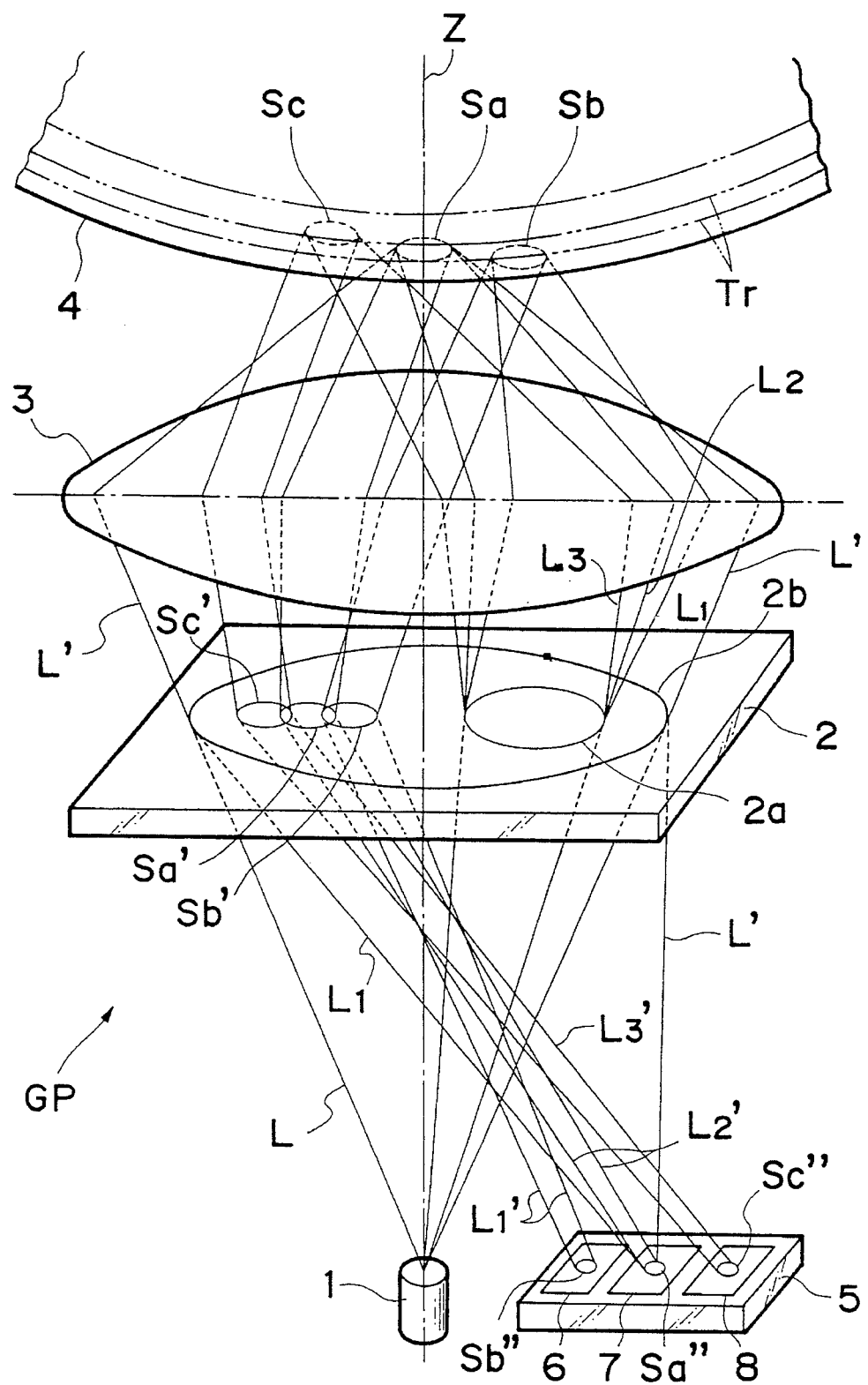
FIG. 2 is a fragmentary perspective view of the optical pick-up device shown in FIG. 1.

Referring to FIG. 2, the laser beam path in the deflection plate type optical pick-up device of FIG. 1 is illustrated. In operation, the laser beam L emitted from the laser diode 1 enters into the deflection plate 2. The laser beam L passing through the first diffraction area 2a is split into three beams L1, L2, and L3 having diffraction orders of "+1", "0", and "−1", respectively. Furthermore, the laser beam L at the second diffraction area 2b is also split into three beams having diffraction orders of "+1", "0", and "−1", respectively. Only the laser beam L' having "0" diffraction order is used. The laser beams L2 and L' are converged by the lens 3 and are focused to form a spot Sa on the recording track of the optical disk 4. Furthermore, the lager beams L1 and L3 are also focused on the optical disk 4 so as to form spots Sb and Sc, respectively, on the opposite side of the recording track on which the spot Sa is formed.

The laser beams L1, L2, and L3 are reflected from the optical disk 4 and are directed toward the second diffraction area 2b by the lens 3 so as to form spots Sb', Sa' and Sc', respectively. The spots Sb', Sa' and Sc' are overlapped each other at the second diffraction area 2b, as shown. Each of laser beams L1, L2, and L3 passing downwardly through the deflection plate 2 is split into three beams having diffraction orders of "+1", "0", and "−1" by the grating formed in the diffraction area 2b to produce nine beams coming down from the diffraction area 2b. Of these nine split laser beams, only three beams L1', L2', and L3' having diffraction order of "+1" by the grating in the diffraction area 2b are led to the photo detector array 5. Photo detector array 5 has three photo detecting portions 6, 7 and 8. By the laser beams L1', L2', and L3', three spots Sb", Sa" and Sc" on a first tracking detector 6, servo detector 7, and second tracking detector 8, respectively.

Figure 3:
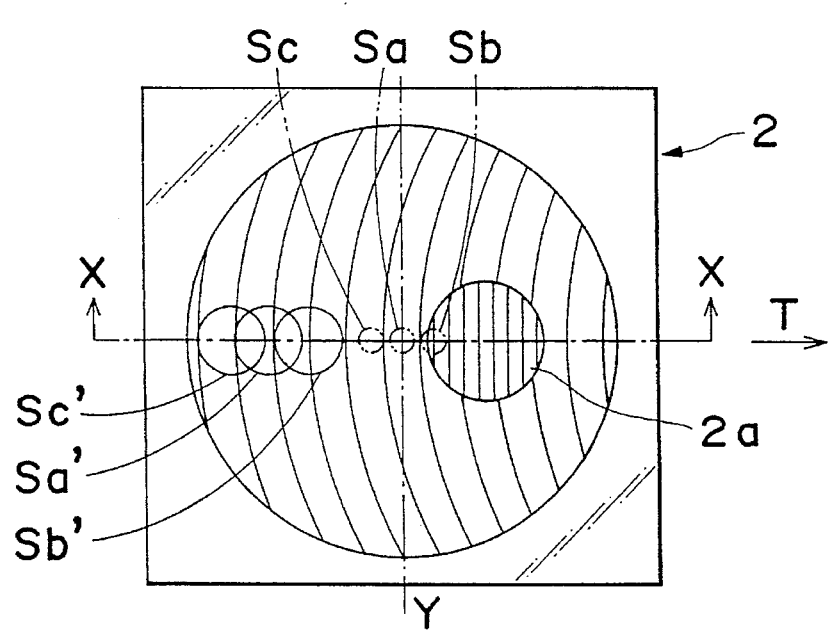
FIG. 3 is a plan view of a deflection plate for use in the optical pick-up device according to the first embodiment of the present invention.
Figure 4:
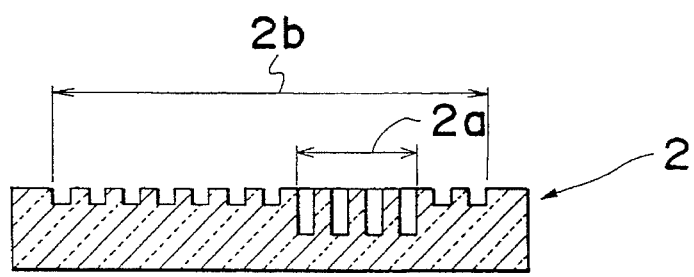
FIG. 4 is a cross sectional view taken along a line X—X shown in FIG. 3.

Referring to FIGS. 3 and 4, a deflection plate 2 of the first embodiment is shown. The first diffraction area 2a has a hologram pattern defined by a plurality of parallel grooves extending parallel to X-axis shown in FIG. 3 and formed on one surface of the deflection plate 2. It is to be noted that the direction T which the track on the optical plate extends is parallel to Y-axis shown in FIG. 3. The second diffraction area 2b has a hologram pattern defined by a plurality of curved grooves on the surface. The curved lines of grooves are determined by the following equation.

$$f(x,y)=Ax^2+ Bxy+Cy^2+Dx+Ey+F=N\lambda$$

(x; y: coordinates of the plane on which the first and second diffraction areas 2a and 2b are located)
($\lambda$: wavelength of the laser beam)
(N: integer including zero)

(A, B, C, D, E, F: constants)

It is to be noted that the hologram pattern of the second diffraction area 2b is so formed as to produce an astigmatism having an angle of 45° relative to the deflection direction. The hologram pattern is actually obtained when the laser diode 1 is a reference beam source and an astigmatic beam source is on the photo detector 5. Furthermore, when "A", "B" and "C" in the above equation are zero, the hologram pattern of diffraction area 2b is defined by a plurality of parallel lines like that of diffraction area 2a. In this case, it is possible to form parallel grooves having different depth or different duty ratio to diffraction areas 2a and 2b, respectively, to obtain desirable diffraction efficiencies or effects.

Figure 5:
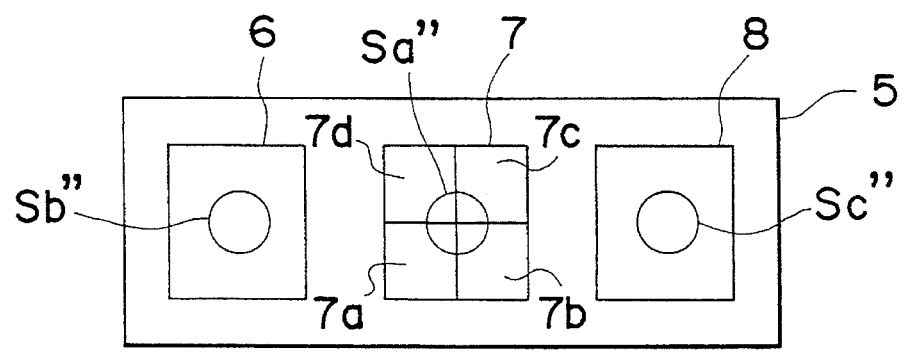
FIG. 5 is a plan view of a photo detector for use in the optical pick-up device according to the first embodiment of the present invention.

It is to be noted that the deflection plate 2 is positioned such that the parallel grooves of the first diffraction area 2a is perpendicular to the direction T of tracks of the optical disk. The spots Sb', Sa', and Sc' are located along the center line X of the deflection plate 2. Furthermore, the spots Sb", Sa", and Sc" focused on each of photo detectors 6, 7, and 8 is shown in FIG. 5.

Figure 15:
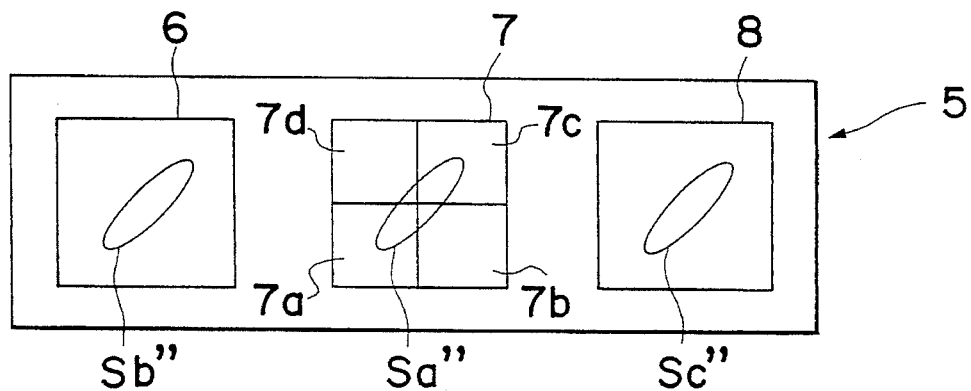
FIG. 15 is a plan view of a photo-detector array particularly showing the spots configurations formed on the photo-detectors when the optical spots are out of focus.
Figure 16:
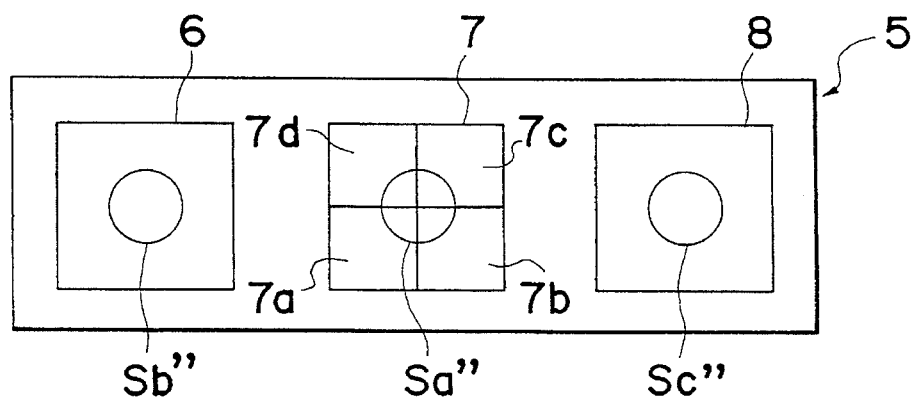
FIG. 16 is a plan view of a photo-detector array particularly showing the spots configurations on the photo detectors when spots are in focus.
Figure 17:
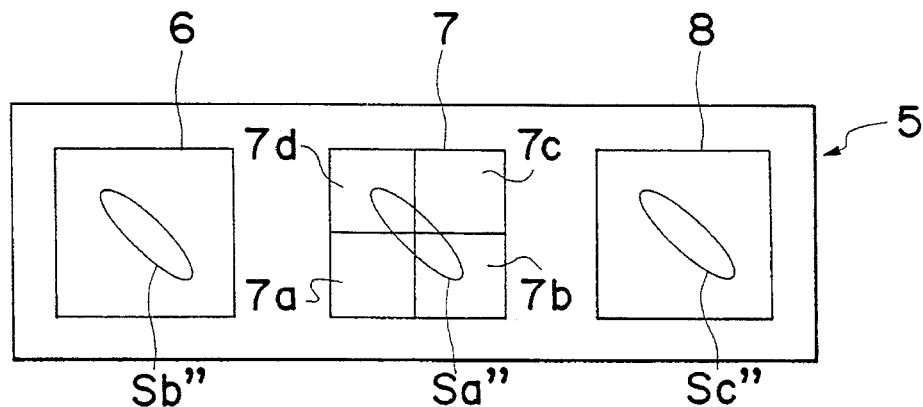
FIG. 17 is a plan view of a photo-detector array particularly showing the spots configurations on the photo detectors when the spots are cut of focus.

Referring to FIG. 15, 16, and 17, the configuration of spots Sb", Sa", and Sc" focused on the photo detectors 6, 7, and 8 are shown under different focusing conditions. FIG. 16 shows a case in which the spots Sb", Sa" and Sc" are properly focused on photo detectors 6, 7 and 8, respectively, meaning that the spots Sb, Sa, and Sc are properly focused on the optical disk 4 surface. FIG. 15 shows a case in which spots Sb", Sa", and Sc" are out of focus such that the spots Sb, Sa, Sc are on focus a position before the optical disk 4. In this case, the elliptical spots lean toward the right side. FIG. 17 shows a case in which spots Sb", Sa", and Sc" are out of focus such that the spots Sb, Sa, and Sc are on focus a position behind the optical disk 4.

Based on the above described facts, an focus error signal $F_0E$ is obtained as follows. As shown in the above described figures, the information detector (servo detector) 7 is comprised of four sections 7a, 7b, 7c, and 7d, from which level signals 7A, 7B, 7C and 7D are produced relatively to the area of the portion of the spot Sa" focused thereon, respectively. The focus error signal $F_0E$ is obtained by the following equation.

$$F_0E = (7A+7C) - (7B+7D).$$

A detail of the "Astigmatism method" used to obtaining the focus error signal $F_0E$ is disclosed by U.S. Pat. No. 4,731,772 issued Mar. 15, 1988 to Wai-Hon Lee.

A tracking error signal $TrE$ is obtained as follows. Since the spots Sb and Sc are located on opposite sides of, but partially overlapping, as shown in FIG. 2, respectively, the first and second tracking detectors 6 and 8 produce level signals E and F relatively to the amount of beam overlapping the track. The tracking error signal $TrE$ is obtained by the following equation.

$$TrE = E - F.$$

In the present invention, the first and second diffraction areas 2a and 2b have different diffraction efficiencies. This is accomplished by forming different hologram patterns for the diffraction areas 2a and 2b. An article disclosed in MICROOPTICS NEWS VOL. 6 NO. 3 P79 to 80 by W.H. Lee, shows the equations to calculate the "0" and "+1" orders of diffraction efficiencies $E_0$ and $E_1$ of the rectangular shaped thin hologram plate as follows.

$$E_0 = (2q-1)^2 \times \sin^2\theta + \cos^2\zeta$$
$$E_1 = (\pi/2 \times \sin\pi q \times \sin\theta)^2$$

($E_0$ is the diffraction efficiency of "0" order)
($E_1$ is the diffraction efficiency of "1" order)
($\theta/180° = d \times (n-1)/80$)
(q: duty ratio)
(d: hologram depth)
(n: refraction ratio of hologram)
(k: wavelength of light)

As apparent from the above, since the diffraction efficiencies $E_0$ and $E_1$ of "0" and "+1" order are determined relatively to the duty ratio q and the hologram depth. The grooves formed in each of the diffraction areas 2a and 2b are determined by selecting a suitable duty ratios and/or hologram depth.

For example, to obtain the maximum value of $E_0 \times E_1$ at the second diffraction area 2b, and the minimum value such (as zero) of $E_0$ and the maximum value of $E_1$ at the first diffraction area 2a, the duty ratio q and the hologram depth d at the diffraction areas 2a and 2b are determined as follows.

At diffraction area 2a, q=0.5 and d=0.5×λ/(n−1).
At diffraction area 2b, q=0.5 and d=0.25×λ/(n−1).

Furthermore, to maintain the $E_0 \times E_1$ at the second diffraction area 2b unchanged, and to make $E_1/E_0=0.2$, the duty ratio q and the hologram depth d are as follows.

At diffraction area 2a, q=0.5 and d=0.20×λ/(n−1).
At diffraction area 2b, q=0.5 and d=0.25×λ/(n−1).
At diffraction area 2a, q=0.72 and d=0.25×λ/(n−1).
At diffraction area 2b, q=0.5 and d=0.25×λ/(n−1).

It is to be noted that the first and second diffraction areas 2a and 2b are illustrated in round shape in the drawings, but any other shape other than the round shape such as ellipse or rectangle is also permissible. Also, the first diffraction area 2a can be located anywhere and preferably the size of area 2a is smaller than that of area 2b.

Although the method to detect the focus error signal $F_0E$ is described according to the "Astigmatic method", any other method such as "spot size detecting method" or "Foucaults method" is also applicable as described bellow.

The detail of the "Spot size detection method" used for obtaining the focus error signal $F_0E$ is disclosed, for example, the papers entitled "Holographic Head with Spot size Detection Method" issued by Japan Society of Applied Physics in 1989.

In spot size detection method, a hologram pattern obtained by using the laser diode 1 as a reference beam source and a spot light source located δZ toward the optical axis from the photo detector 7 as an object beam source can be employed. Here, δZ is expressed by the following equation.

$$\delta Z = ds/2 \times NA.$$

(ds: a diameter of spot Sa" focused on the photo detector 7)
(NA: aperture number of beam entering into the photo detector 7).

Furthermore, the hologram pattern can be obtained such that the beams parallel to the optical axis and not including the wave front aberration is used as a reference beam, and the beams parallel to the optical axis and including the wave front aberration expressed by the following equation used as an object beam source.

$$W(r) = kr^2$$

(r: a distance between the beam and the optical axis)
(k: constant)

The detail of the "Foucaults method" is disclosed, for example, the papers entitled "An Optical Head Using Mult- Functional Hologram for CD Players" issued in 1986, by "Hikari Memori Sinpojium". "Foucaults method" is described later with reference to the third embodiment of the present invention.

SECOND EMBODIMENT

Figure 6:
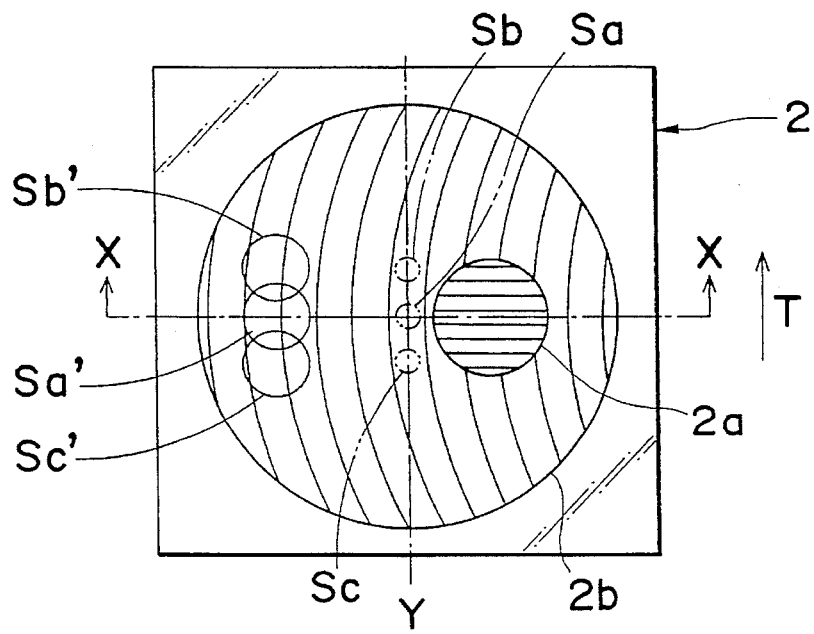
FIG. 6 is a plan view of a deflection plate for use in an optical pick-up device according to a second embodiment of the present invention.
Figure 7:
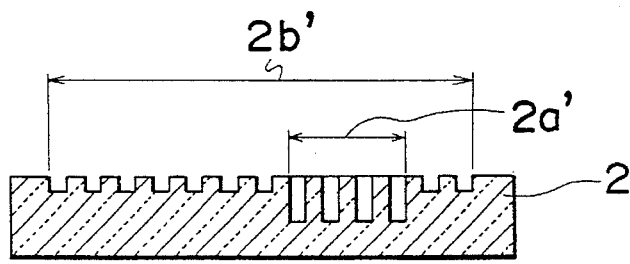
FIG. 7 is a cross sectional view taken along a line X—X shown in FIG. 6.
Figure 8:
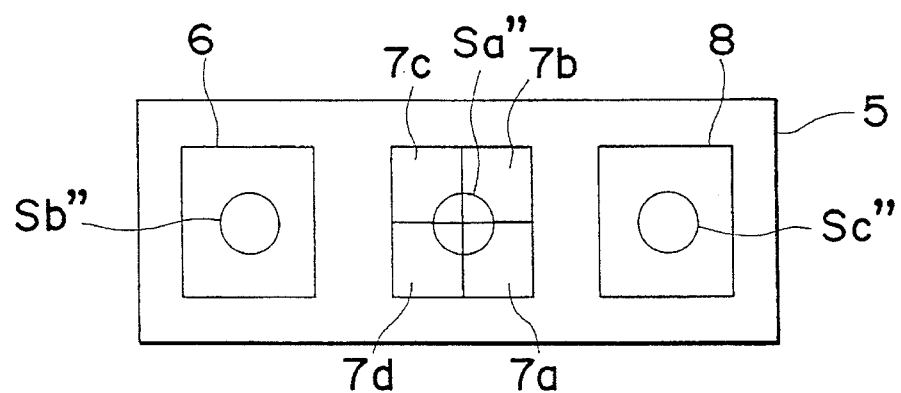
FIG. 8 is a plan view of a photo detector for use in the optical pick-up device according to the second embodiment of the present invention.

Referring to FIGS. 6 and 7, the deflection plate 2 according to the second embodiment is shown. When compared with the plate shown in FIGS. 3 and 4, the plate 2 of the second embodiment has a first diffraction area 2a arranged such that the grooves extend parallel to X-axis, as shown in FIG. 6. It is to be noted that the direction T which the track on the optical plate extends is parallel to Y-axis shown in FIG. 6. Furthermore, the spots Sb", Sa", and Sc" focused on each of photo detectors 6, 7, and 8 is shown in FIG. 8.

THIRD EMBODIMENT

Figure 9:
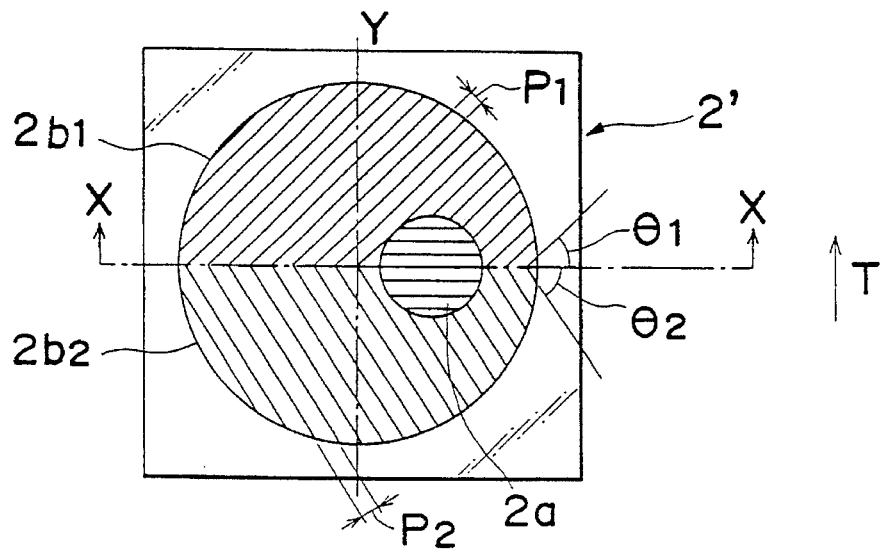
FIG. 9 is a plan view of a deflection plate according to a third embodiment of the present invention.

Referring to FIG. 9, the deflection plate 2' according to a third embodiment is shown which employs Foucaults method for obtaining the focus error signal $F_0E$. In this embodiment, the second diffraction area 2b is divided into a first and a second half areas $2b_1$ and $2b_2$ along the X axis. The first half area $2b_1$ has a hologram pattern defined by a plurality of parallel grooves. The grooves are apart from each other by $P_1$ and is crossing the X axis with an angle $\theta_1$. The second half area $2b_2$ also has a hologram pattern defined by a plurality of parallel grooves. The grooves are apart from each other by $P_2$ and is crossing the X axis with an angle $\theta_2$. Although any suitable value can be used for $P_1$, $P_2$, $\theta_1$, and $\theta_2$, it should be noted that when $P_1$ is equal to $P_2$, $\theta_1$ shall not be equal $\theta_2$.

Figure 10:
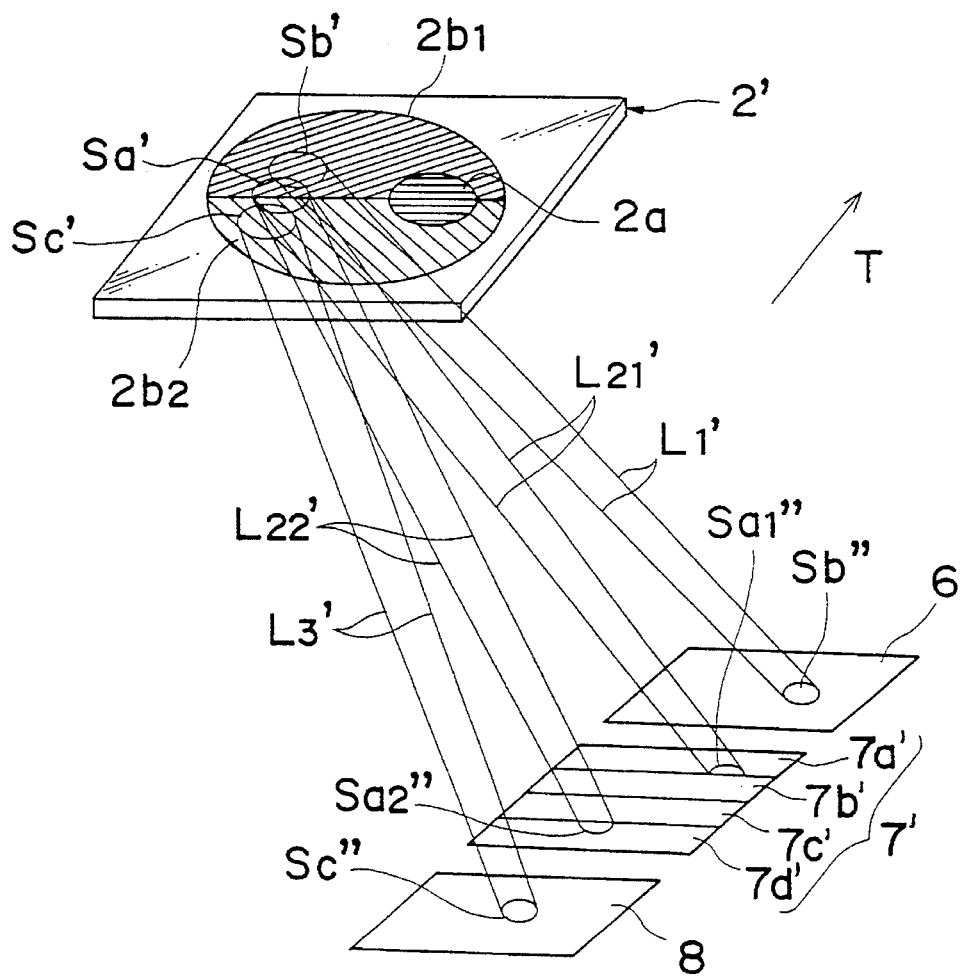
FIG. 10 is a schematic perspective view of the optical pick-up device according to the third embodiment of the present invention.

Referring to FIG. 10, the laser beam path in the deflection plate type optical pick-up device using the deflection plate 2' is illustrated. In this pick-up device, the laser beams L1, L2, and L3 are reflected by the optical disk 4 and are entered into the deflection plate 2' in a similar manner described above. It is to be noted that the laser beam L1 makes a spot Sb' in the first half area $2b_1$; the laser beam L2 makes a spot Sa' in the boundary area between the first and second half area $2b_1$ and $2b_2$ such that by that boundary area a half of spot Sa' is divided into two semi circle spots on the first and second half areas $2b_1$ and $2b_2$, respectively; and the laser beam L3 make a spot Sc' in the second half area $2b_2$. The diffracted laser beams L1' and L3' of "+1" diffraction order are directed toward the photo detectors 6 and 8, respectively, in similar manner as described above. However, from the spot Sa', two diffracted beams L21' and L22' of "+1" diffraction order are produced. The beams L21' and L22' are respectively led toward the photo detector 7' having four sections 7a', 7b', 7c' and 7d' for producing level signals 7A', 7S', 7C' and 7D', respectively, in response to the amount of light impinged thereon. The laser beam L21' from the first half area $2b_1$ forms a semi circle spot $Sa_1$" on the boundary between the first and second sections 7a' and 7b'. The laser beam 522' from the second half area $2b_2$ forms a semi circle spot $Sa_2$" the boundary between the third and fourth sections 7c' and 7d'. The focus error signal $F_0E$ and tracking error signal TrE are obtained by the following equations.

$F_0E=(7A'-7B')+(7D'-7C)$.

$TrE=F-E$.

FOURTH EMBODIMENT

Figure 13:
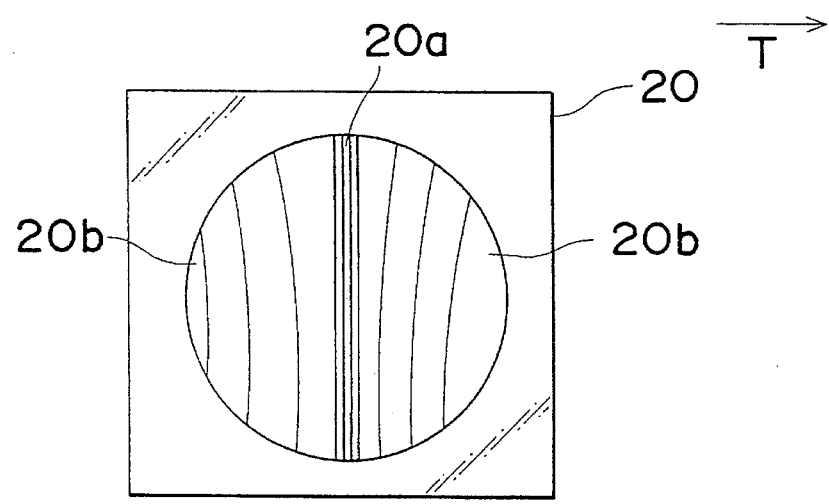
FIG. 13 is a plan view of a deflection plate according to a fourth embodiment of the present invention.

Referring to FIG. 13, a deflection plate according to a fourth embodiment of the present invention is shown. The deflection plate 20 comprises a first diffraction area 20a along a center line thereof and a second diffraction areas 20b, 20b on the opposite sides of the first diffraction area 20a and on the surface thereof. The first and second diffraction areas 20a and 20b have hologram pattern defined by a plurality of parallel grooves and a plurality of curved grooves, respectively, in a manner similar to that described above in connection with FIGS. 3 and 4. However, the first diffraction area 20a is elongated, along Y direction, and the second diffraction area 20b is separated in two parts. The deflection plate 20 is located in the pick-up device such that the elongated first diffraction area 20a is perpendicular to the tracking direction T of,the optical disk 4.

Figure 11:
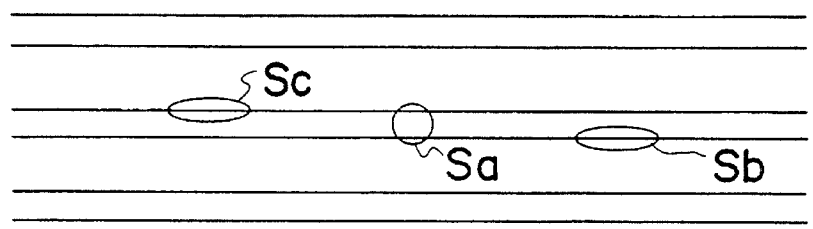
FIG. 11 is a plan view of an optical disk showing the desirable relationship between the positions of laser spots on the aimed track of the optical disk.
Figure 12:
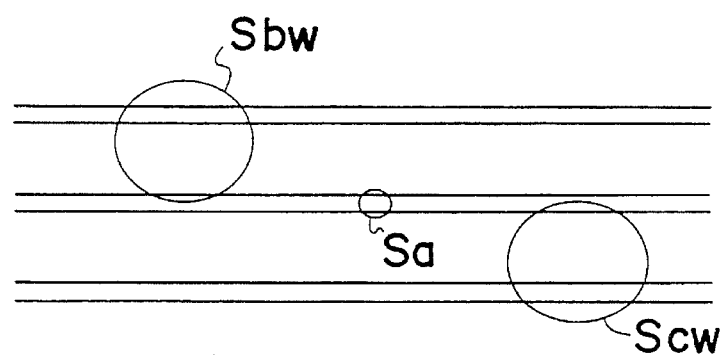
FIG. 12 is a plan view of an optical disk showing the undesirable relationship between the positions of laser spots on the aimed track of the optical disk.

The deflection plate 20 of the fourth embodiment has the following advantage. According to the deflection plates 2 and 2' of the previous embodiments, the laser beams passing through the small first diffraction area 2a results in small spots Sb and Sc for detecting tracking error. When the effective NA of the beams is small, the sports Sb and Sc on the optical disk 4 is undesirably large, as shown in FIG. 12. In such a case, the large spots Sb and Sc may cover the adjacent tracks. On the contrary, according to the fourth embodiment, since the elongated first diffraction area 20a is located perpendicular to the tracking direction, spots Sb and Sc can be made at e size small enough to detect the aimed track as shown in FIG. 11.

Figure 14:
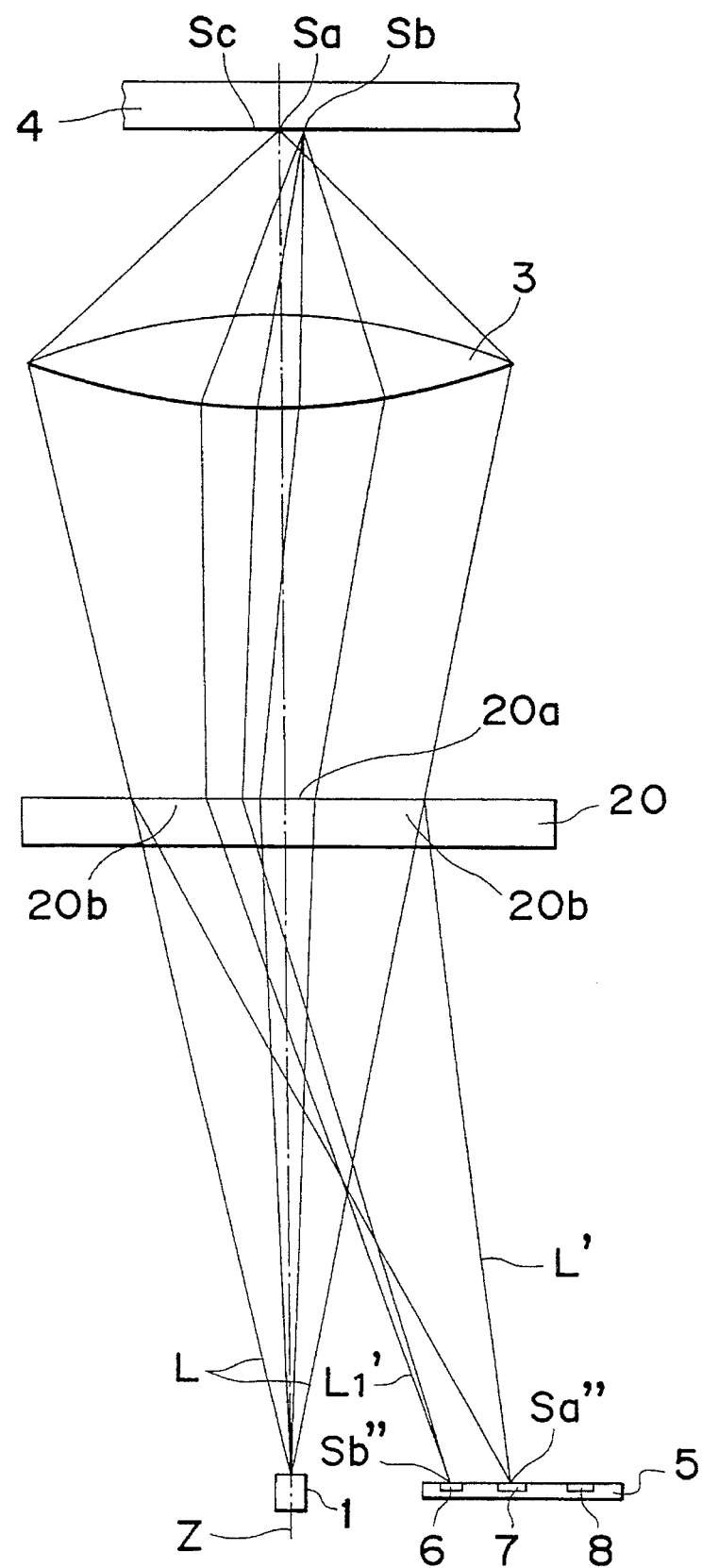
FIG. 14 is a schematic view of an optical pick-up device according to the fourth embodiment of the present invention.

Referring to FIG. 14, the laser beam path in the deflection plate type optical pick-up device using the deflection plate 20 is illustrated. For the brevity of explanation, only the laser beams L1 is described. As shown, the laser beam L1, diffracted by the elongated first diffraction area 20a is focused the spot Sb on the optical disk through the lens 3 and is reflected therefrom to enter in second diffraction area 20b through the lens 3. The "+1" order of diffracted beam L1' produced from the reflected beam is led to the photo detector 6.

FIFTH EMBODIMENT

Figure 18:
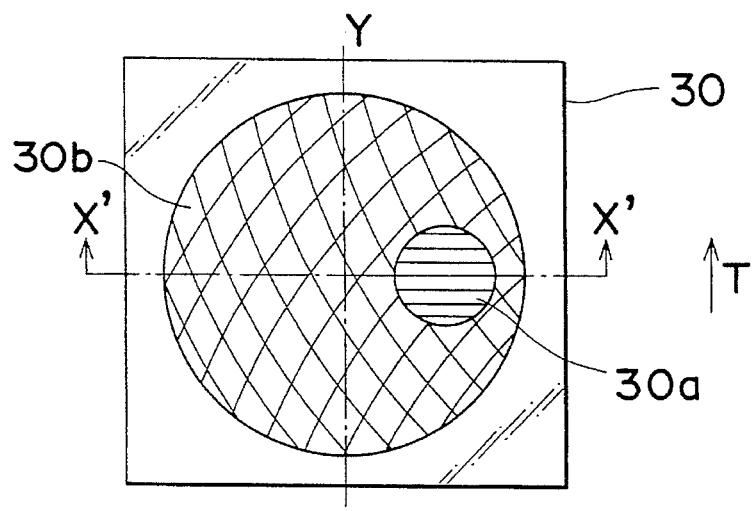
FIG. 18 is a plan view of a deflection plate according to a fifth embodiment of the present invention.
Figure 19:
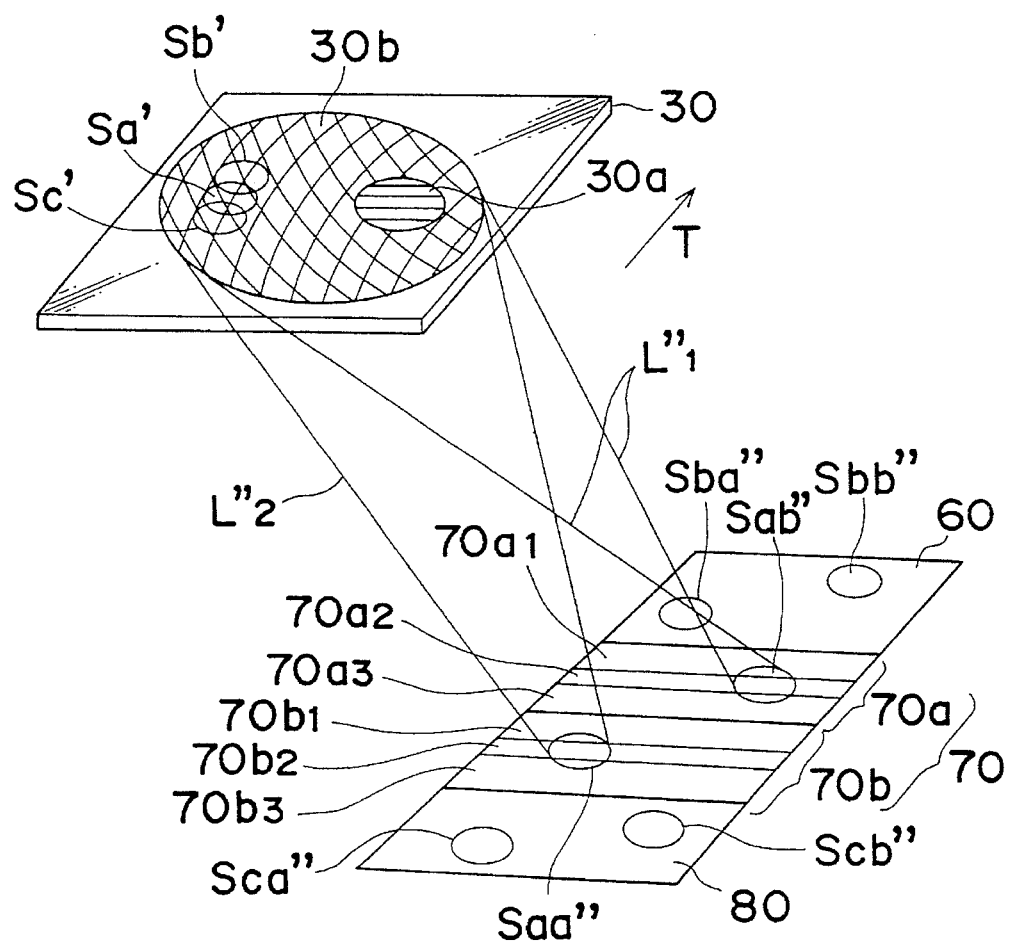
FIG. 19 is a schematic perspective view of the optical pick-up device according to the fifth embodiment of the present invention.

Referring to FIGS. 18 and 19, a deflection plate 30 according to spot size detection method is shown. In this embodiment, the first diffraction area 30a has a hologram pattern in the same manner as that described above in connection with FIG. 3. The second diffraction area 30b has two hologram patterns superimposed one over other. As shown in FIG. 18, for the brevity of explanation, only the laser beams $L"_1$ and $L"_2$ which diffraction order is "+1" is described. The laser beam L' (not shown) reflected by the optical disk 4 enters the deflection plate 30. The laser beam L' is split into three beams by each of the two superimposed patterns. Of these split beams, two of "+1" order beams L"1 and L"2 are led to focus two spots Sab" and Saa", respectively, on the information detector 70 comprised of sub sections 70a and 70b. The sub sections 70a further includes detector sections 70a1, 70a2, and 70a3 for producing level signal 70A, 70B, and 70C relatively to the spot Sab" focused thereon. The sub section 70b also includes detector sections 70b1, 70b2, and 70b3 for producing level signal 70A', 70B', and 70C' relatively to the spot Saa" focused thereon. The first and second tracking detectors 60 and 80 also produce level signals 60E and 80F relatively to the spots Sba" and Sbb", and spots Sca" and Scb", respectively. The focus error signal $F_0E$ and tracking error signal TrE are obtained by the following equations.

$F_0E=(70A+70C+70B')-(70B+70A'+70C')$.

$TrE=60E-80F$.

SIXTH EMBODIMENT

Figure 20:
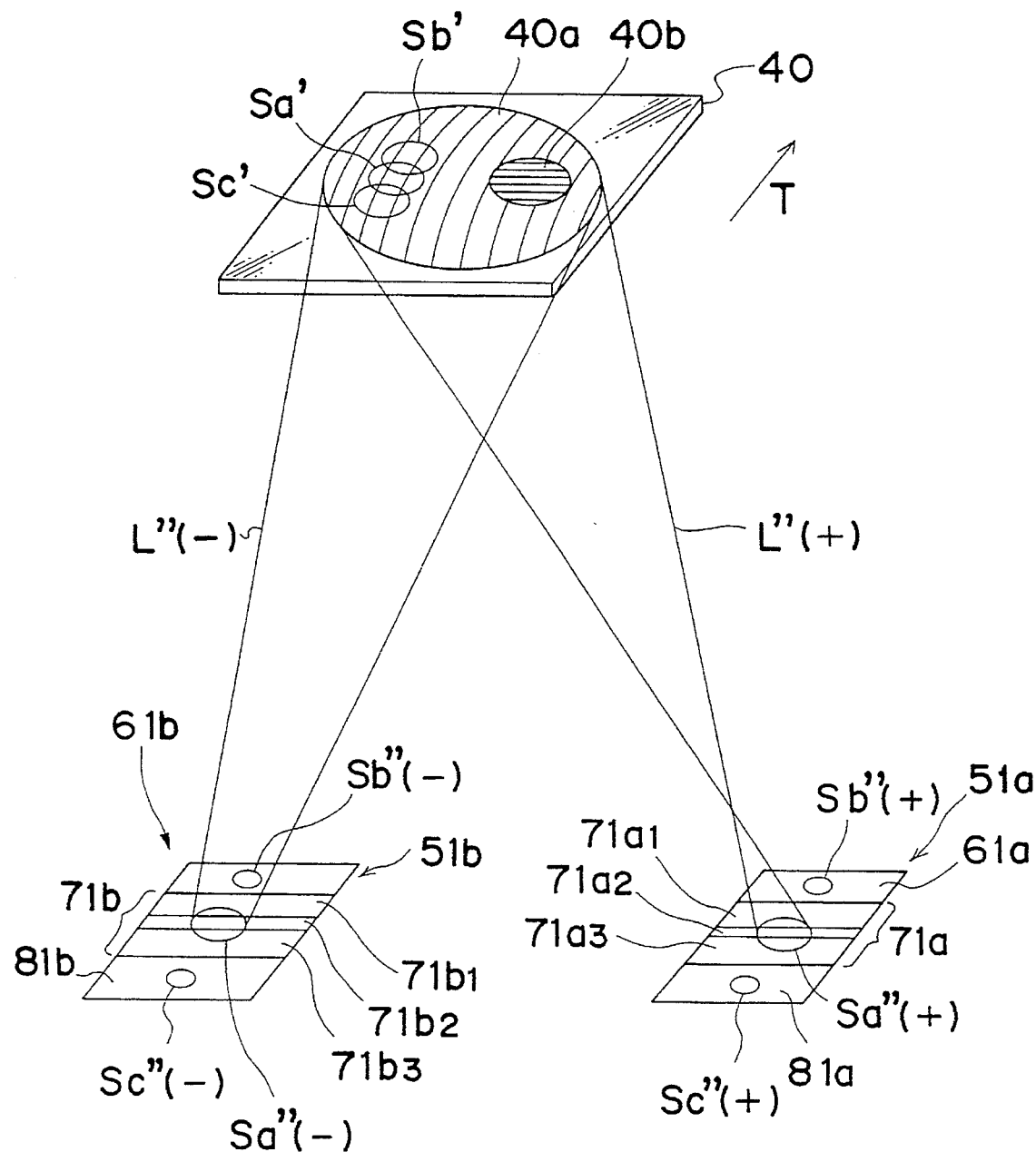
FIG. 20 is a schematic perspective view of the optical pick-up device according to a sixth embodiment of the present invention.
Figure 21:
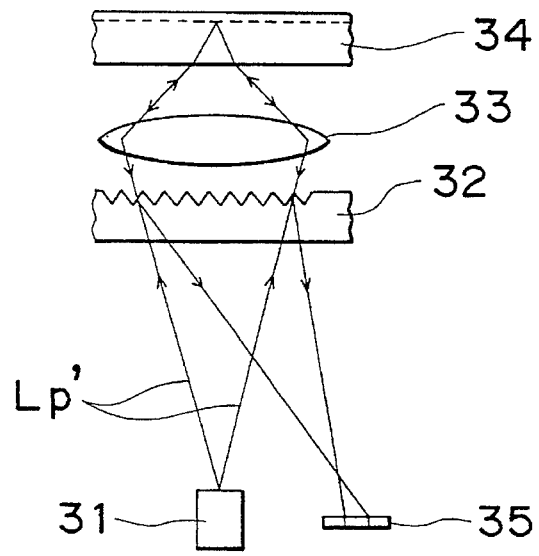
FIG. 21 is a schematic view of a conventional optical pick-up device.
Figure 23:
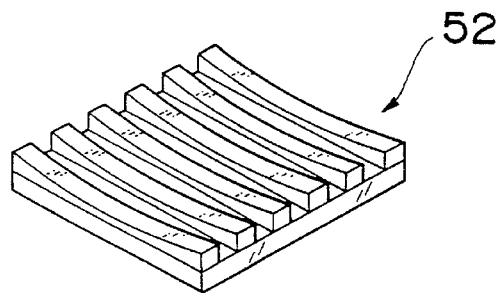
FIG. 23 is a schematic perspective view of a convention deflection plate.
Figure 24:
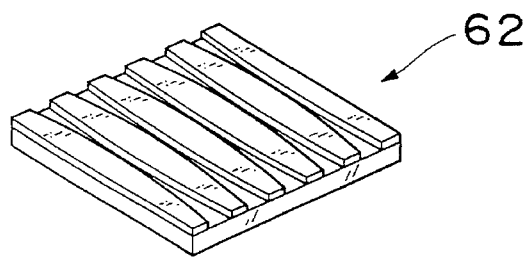
FIG. 24 is a schematic perspective view of another conventional deflection plate.
Figure 22:
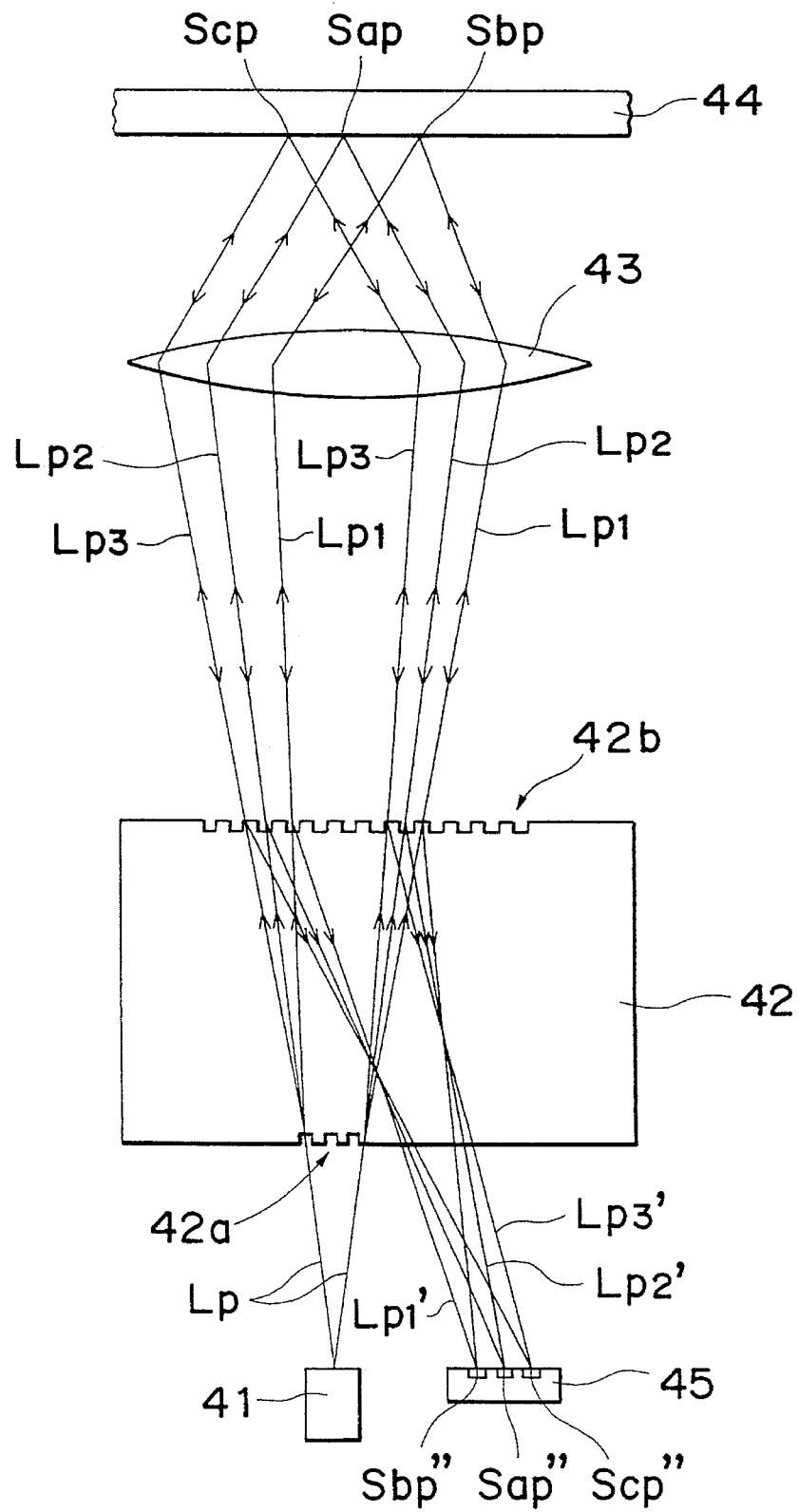
FIG. 22 is a schematic view of another conventional optical pick-up device.

Referring to FIG. 20, a deflection plate according to a sixth embodiment of The present invention is shown. The deflection plate 40 is applied with the spot size detection method. In this embodiment, the deflection plate 40 has the first and second diffraction area 40a and 40b. The first diffraction area 40a has a hologram pattern in the same manner as that described above in connection with FIG. 3. The second diffraction area 30b has a hologram pattern described above in connection the spot size detection method in FIG. 3. As shown in FIG. 20, for the sake of brevity, only the laser beams L"$_{+1}$ and L"$_{-1}$ which have diffraction orders of "+1" and "-1", respectively, are described. The laser beam L' (not shown) reflected by the optical disk 4 enters the deflection plate 40. The reflected laser beam L' is split into three beams by the second diffraction area 40b. Of these split beams, two laser beams L"(+) and L"(-) are led to a first and a second photo detector 51a and 51b, respectively. The first photo detector 51a has a first and a second tracking detectors 61a and 81a, and an information detector 71a. The information detector 71a includes sub sections 71a1, 71a2, and 71a3 for producing level signals 70A, 70B, and 70C relatively to a spot Sa"(+), respectively. The first and second tracking detectors 61a and 81a also produce level signals 60E and 80F relatively to spots Sb"(+) and Sc"(+) made thereon. In the similar manner, the second photo detector 51b includes a first and a second tracking detector 61b and 81b for producing level signals 60E' and 80F' in response to spots Sb"(-) and Sc"(-) made thereon, and the second information detector 71b. The information detector 71b also includes sub sections 71b1, 71b2, and 71c2 for producing level signals 70A', 70B', and 70C' relatively to spot Sa"(-). The focus error signal $F_0E$ and tracking error signal TrE are obtained by the following equations.

$$F_0E = (70A + 70C + 70B') - (70B + 70A' + 70C').$$

$$TrE = (60E + 60E') - (80F + 80F').$$

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A deflection plate for deflecting laser beams comprising:

a transparent plate having first and second surfaces and a center, wherein the center is a function of an optical axis of an optical pick-up device, wherein the center is defined as a point where the optical axis of the optical pick-up device and a hologram pattern area formed on the deflection plate intersect;

a first grating area formed on said first to surface and formed asymmetrical with respect to the center of the transparent place, said first grating area having a plurality of parallel grooves formed in said transparent plate with a first predetermined duty ratio, each parallel groove having a first predetermined depth; and a second grating area formed on said first surface and surrounding said first grating area, said second grating area having a plurality of grooves formed in said transparent plate in a predetermined pattern with a second predetermined duty ratio, each groove having a second predetermined depth different from said first predetermined depth.

2. A deflection plate as claimed in claim 1, wherein said first predetermined duty ratio is equal to said second predetermined duty ratio.

3. An optical pick-up device for reading/writing information from/on an optical recording medium comprising:

laser beam source means for emitting a laser beam;

converging lens means located adjacent said optical recording medium;

a deflection plate located in an optical path between said laser beam source means and said convering lens means for deflecting said laser beams, said deflection plate comprising:

a transparent plate having first and second surfaces and a center, wherein the center is a function of an optical axis of an optical pick-up device, wherein the center is defined as a point where the optical axis of the optical pick-up device and a hologram pattern area formed on the deflection plate intersect;

a first grating area formed on said first surface and formed asymmetrical with respect to the center of the transparent plate, said first grating area having a plurality of parallel grooves formed in said transparent plate with a first predetermined duty ratio, each parallel groove having a first predetermined depth, said first grating area receiving incoming laser beam from said laser beam source means for splitting the laser beam into at least three split beams having 0, +1 and -1 diffraction orders, respectively, said three split beams directed through said converging lens means and reflecting on said optical recording medium; and a second grating area formed on said first surface and surrounding said first grating area, said second grating area having a plurality of grooves formed in said transparent plate in a predetermined pattern with a second predetermined duny ratio, each groove having a second predetermined depth different from said first predetermined depth, said second grating area receiving three reflected laser beams from said optical recording medium for splitting each of the three reflected laser beams into at least three sub-split beams having 0, +1 and -1 diffraction orders, respectively; and beam receiving means for receiving three sub-split beams from said second grating area for converting the received beam to electric signal.

4. A deflection plate for deflecting laser beams comprising:

a transparent plate having first and second surfaces and a center, wherein the center is a function of an optical axis of an optical pick-up device, wherein the center is defined as a point where the optical axis of the optical pick-up device and a hologram pattern area formed on the deflection plate intersect;

a first gracing area formed on said first surface and formed asymmetrical with respect to the center of the transparent plate, said first grating area having a plurality of parallel grooves formed in said transparent plate with a first predetermined duty ratio, each parallel groove having a first predetermined depth; and a second grating area formed on said first surface and surrounding said first grating area, said second grating area having a plurality of grooves formed in said transparent plane in a predetermined pattern with a second predetermined duty ratio different from said first predetermined duty ratio, each groove having a second predetermined depth.

5. A deflection plate as claimed in claim 4, wherein said first predetermined depth is equal to said second predetermined depth.

6. A deflection plate as claimed in claim 1, wherein the first grating area is for receiving an incoming laser beam from a laser beam source and the second grating area is for receiving three reflected laser beams from an optical recording medium.

* * * * *

UNITED STATES PATENT AND TRADEMARK OFFICE
CERTIFICATE OF CORRECTION

PATENT NO. : 5,475,670
DATED : Dec. 12, 1995
INVENTOR(S) : Hamada, et al

It is certified that error appears in the above-indentified patent and that said Letters Patent is hereby corrected as shown below:

Column 9, line 58, delete "to".

Column 10, line 39, delete "duny" insert --duty--.

Column 10, line 67, delete "plane" insert --plate--.

Signed and Sealed this

Eighteenth Day of June, 1996

Attest:

BRUCE LEHMAN

Attesting Officer     Commissioner of Patents and Trademarks